Patented Oct. 10, 1939

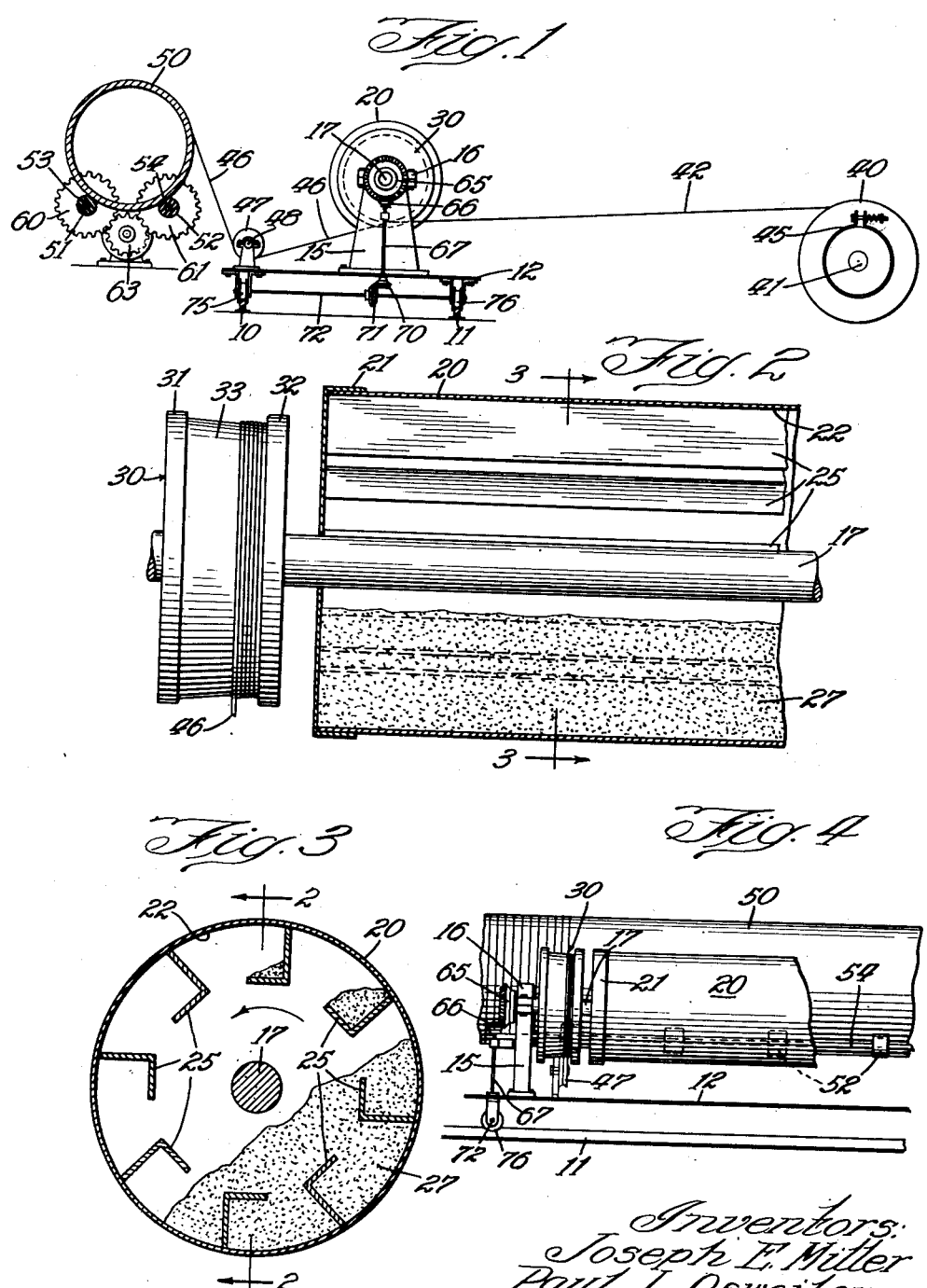

2,175,479

UNITED STATES PATENT OFFICE 2,175,479

METHOD OF AND MEANS FOR MAKING REINFORCED PIPE

Joseph E. Miller and Paul L. Osweiler, Oak Park, Ill.

Application November 26, 1937, Serial No. 176,604

8 Claims. (Cl. 242—11)

This invention relates to a method of and means for manufacturing reinforced concrete pipe. In our previous application, Serial No. 159,165, filed August 14, 1937, we have disclosed a method for winding steel wire around a concrete pipe with the wire under tension so as to induce in the concrete a compression strain. This precompressed pipe may then be utilized for water pressures substantially in excess of ordinary piping without the concrete giving way. As pointed out in the above identified application, it had been difficult to apply the reinforcing wire under satisfactory tension in a simple and effective manner. The method and means disclosed herein represent an improvement on the above identified application.

The application referred to above discloses the winding of the wire on the pipe and the tensioning thereof by providing a drag upon a primary roll from which the wire is fed to the pipe. In order to obtain uniform tension in the wire—and this is important—it is necessary to provide a uniform drag on the roll from which the wire is unwound on to the pipe. In the application referred to above, the drag comprised an ordinary brake mechanism. While this mechanism is practical and simple, it suffers from several drawbacks. For one thing, the drag involves the generation of considerable heat which tends to elongate the various metal parts and tends to vary the braking force. This requires the attendance of an operator to supervise the braking operation and make the proper compensating adjustments. Furthermore, it is clear that brakes wear and require renewal.

In the invention herein disclosed, a braking means or retarding means is disclosed which is simple, extremely cheap to construct, and, in operation, maintains an unusually uniform level of efficiency. In general, the retarding means contemplates the use of a closed cylinder having vanes or paddles inside thereof and rigid therewith. Within this cylinder is a quantity of loose material such as sand, stones, water or the like. The entire device tends to operate as a mixer or agitator and the load thus created is used to tension the wire. By adjusting the amount of sand within the cylinder, together with the dimensions of the various mechanical parts, a delicate control may be exercised over the amount of load created. Furthermore, once the desired amount of load has been created, the entire mechanism operates with such uniformity as to be thoroughly automatic and avoid the necessity for any further attention. A further advantage of this mechanism lies in the fact that the sand may be emptied prior to shipment to any desired point and thereafter a measured quantity of sand may be reintroduced.

In the application referred to above, a primary roll was utilized upon which the reinforcing wire was wound at a certain predetermined pitch. During the unwinding operation, the reinforcing wire automatically laid itself on the pipe in desired position. In the invention disclosed herein, the function of the primary roll has been reduced to merely feeding the reinforcing wire under tension. The portion of the machine corresponding to the primary roll is wound several times with the reinforcing wire and by virtue of the friction between the wire and the roll, and the fact that a drag is imposed upon said roll, maintains the wire between it and the pipe under tension. The primary source of reinforcing wire may be a reel so that the entire process is somewhat simplified. The proper pitch upon the pipe is preferably obtained by moving the roll with reference to the pipe as the wire is fed.

In order to maintain the reinforcing wire between the feed roll and the pipe, it is necessary to prevent the concrete pipe from unrolling the reinforcing wire. It is clear that a simple and universal means is desirable in order to accommodate various sizes of pipes. We have determined that the use of rubber driven rollers upon which the concrete pipe rests, satisfies these requirements to an unusual degree. Such rollers are comparatively long lived and are flexible enough to accommodate irregularities in pipes.

Referring to the drawing:

Figure 1 shows an end view of a mechanism for reinforcing concrete pipe.

Figure 2 is a view partly in section along the line 2—2 of Figure 3.

Figure 3 is a view in section along line 3—3 of Figure 2.

Figure 4 is a side view of the mechanism shown in Figure 1.

Supported on a pair of tracks 10 and 11 is a rolling carriage 12 functioning as a movable base. Carried by this base 12 are a pair of standards 15, only one of which is visible, terminating in bearings 16. Rotatively supported in these bearings is a shaft 17. This shaft carries an elongated cylinder 20 whose ends are closed by plates 21 which may be removable if desired. Cylinder 20 carries on the inside surface 22 thereof a plurality of angle irons 25 preferably uniformly distributed around the circumference of the section. These angle irons preferably extend the full length of cylinder 20. Within the cylinder is disposed a quantity of sand 27 or any other loose material. This material may be introduced into and removed from the cylinder by any suitable means such as removal of one of the end plates or a small trap door.

Shaft 17 also carries a steel drum 30 rigidly joined thereto. This drum is provided with flanges 31 and 32 and between these two flanges there is provided a tapering conical surface 33. Surface 33 tapers down toward flange 32 and forms the frustum of a cone. The degree of taper need not be great and in practice is just enough to crowd the coils against each other with the end turn against the flange 32. The friction between adjacent coil turns as well as against the drum surface maintains the wire under tension.

A reel 40, supported in any suitable manner on a shaft 41, has a quantity of steel reinforcing wire 42 wound thereon. This reel preferably has a small brake 45 which merely acts to prevent the reel from freely rotating. Steel reinforcing wire 42 is wound around conical pulley surface 33 a plurality of times with the reel end of the wire going in near the high side of the pulley. The wire then continues from pulley surface 33 and under tension is indicated by numeral 46. This wire is fed downwardly toward base 12 and is preferably guided by a pulley 47 rotatively mounted on a shaft 48 carried on base 12.

Tensioned wire 46, after passing through drum 47, goes upwardly around concrete pipe 50. The free end of the wire may be clamped or retained on the concrete pipe by the means disclosed in our application, Serial No. 165,863, filed September 27, 1937. The connecting clamp there disclosed may also be used for joining the ends of the reinforcing wire in the machine disclosed herein. This pipe is supported upon a system of rubber rollers 51 and 52 disposed over shafts 53 and 54. These shafts and rollers are spaced apart at a great enough distance so that in practice the various sizes of concrete pipe in current production may be accommodated.

Rubber rollers 51 and 52 are driven through gearing 60 and 61 by a suitable source of power 63.

In the course of the winding operation, the entire carriage or movable base 12 is moved along the tracks to wind the wire at the desired pitch on the concrete pipe. This is accomplished by a bevel gear 65 mounted on an end of shaft 17. Gear 65 engages gear 66 coupled to a vertical stub shaft 67 suitably journalled. The bottom of shaft 67 carries a bevel gear 70 which engages gear 71 on axle 72 of wheels 75 and 76 upon which one end of base 12 is carried. Obviously, as shaft 17 is turned by the pulling of the wire, the entire carriage will be gradually moved along. The gear ratio may be chosen to provide any desired pitch on the concrete pipe.

In the operation of the device, the coils of reinforcing wire around the conical surface 33 tend to work down against flange 32 and the wire is thus rigidly fed out to the concrete pipe. As pointed out above, the sand 27 creates a sufficient drag upon shaft 17 so that the wire 46 is tensioned to any desired degree.

It is understood of course that cast iron pipes which are frequently reinforced with steel wire are to be considered as the equivalent of concrete pipe and that the invention herein is applicable thereto.

What is claimed is:

1. In a machine for applying reinforcing wire to concrete pipe, the combination of means for rotating a concrete pipe section, means for supplying reinforcing wire to said pipe, and means for imposing a drag on said supply means to tension the wire as it is wound on the pipe, said drag means comprising a closed hollow horizontal cylinder having a plurality of solid blade members in the interior thereof extending the full cylinder length, and adapted to operate upon a quantity of loose material such as sand within said hollow cylinder and to be agitated by the blades to create the drag.

2. In a machine for applying reinforcing wire to concrete pipe, the combination of means for rotating a concrete pipe section, and means for supplying reinforcing wire to said pipe, said wire supplying means including a flanged conical drum adapted to have a plurality of turns of reinforcing wire therearound with the wire feeding away from the small end of said drum, and a closed hollow horizontal cylinder rotatively coupled to said drum having a plurality of solid blades extending inwardly within the cylinder extending the full cylinder length and adapted to operate upon a quantity of loose material such as sand within the cylinder to be agitated by said blades whereby the wire around said pulley is tensioned as it is fed to said pipe.

3. The structure of claim 2 wherein said wire supplying means is movable relatively to said pipe section axially thereof whereby the reinforcing wire may be wound on in a helical fashion.

4. A machine for wrapping tensioned steel wire reinforcement around a concrete pipe, said machine including a plurality of cylindrical friction rollers each having a yielding surface whose axes are disposed in spaced parallel relationship and against which rollers a concrete pipe is adapted to rest and be supported, said rollers contacting the pipe substantially throughout the length of the rollers and the length and number of rollers along each axis being sufficient so that a section of an entire concrete pipe is supported at spaced intermediate regions along the entire length thereof, said pipe having one end of a continuous wire reinforcement rigidly fastened thereto, means for rotating said pipe to wind said wire around it, means for supplying said wire to said pipe as it turns to wind said wire as a helix on said pipe, the coils of said helix engaging said rollers, and means for tensioning said wire during the winding operation, said wire under tension forcing said pipe against said rollers.

5. The structure of claim 4 wherein said means for rotating said pipe comprises means for rotating said resilient rollers, which by friction transmit said rotation to said pipe.

6. The structure of claim 4 wherein said wire tensioning means include a closed hollow rotatable horizontal cylinder having a plurality of solid vanes extending the full cylinder length and extending inwardly therefrom and adapted to operate on a quantity of loose material such as sand during the turning thereof and wherein said reinforcing wire is adapted to be wound around a drum rigidly connected with said closed cylinder.

7. In a machine for winding steel reinforcing wire around a concrete pipe, the combination of a plurality of rubber friction rollers against which a concrete pipe section rests and is supported, means for driving at least certain of said rollers for rotating said pipe, a wire supply means including a flanged conical drum around which said reinforcing wire is wound and from the small end of which the wire is fed to said pipe, and means for imposing a drag on said drum to tension said wire, said means including a closed hollow horizontal cylinder rotatable with said drum and having a plurality of inwardly extending solid vanes extending substantially the full length of the cylinder and adapted to operate upon a loose material such as sand.

8. In a machine for applying steel reinforcing wire on a concrete pipe section, the combination of a plurality of rubber friction rollers against which a concrete pipe section is adapted to rest and be supported, means for driving at least certain of said rollers to rotate said pipe, a reinforcing wire supply means including a flanged conical drum around which a plurality of turns of reinforcing wire is adapted to be wound with the wire being fed from the small end of the drum to the pipe, means for imposing a drag on said drum to tension said wire, said means including a closed hollow rotatable horizontal cylinder having a plurality of solid vanes extending the whole cylinder length and extending inwardly therefrom and adapted to operate on a quantity of loose material such as sand, and means for moving said wire supply means relatively to said pipe in an axial direction to impart a helical pitch to said wire as it is wound on said pipe.

JOSEPH E. MILLER.
PAUL L. OSWEILER.